United States Patent
Varga et al.

(10) Patent No.: US 12,050,278 B2
(45) Date of Patent: Jul. 30, 2024

(54) INDIRECT-VIEW QUAD CELL DETECTOR FOR SUN TRACKING

(71) Applicant: PLANET A ENERGY, INC., Pasadena, CA (US)

(72) Inventors: Emerick Varga, Los Angeles, CA (US); Russell Neff, Glendale, CA (US); Braden Eric Hines, Pasadena, CA (US)

(73) Assignee: Planet A Energy, Inc., Pasadena, CA (US)

( * ) Notice: Subject to any disclaimer, the term of this patent is extended or adjusted under 35 U.S.C. 154(b) by 0 days.

(21) Appl. No.: 18/477,478

(22) Filed: Sep. 28, 2023

(65) Prior Publication Data

US 2024/0118362 A1    Apr. 11, 2024

Related U.S. Application Data

(60) Provisional application No. 63/377,624, filed on Sep. 29, 2022.

(51) Int. Cl.
G01S 3/786    (2006.01)

(52) U.S. Cl.
CPC ................... *G01S 3/7861* (2013.01)

(58) Field of Classification Search
CPC .............................. G01S 3/7861; F24S 50/80
See application file for complete search history.

(56) References Cited

U.S. PATENT DOCUMENTS

| | | | |
|---|---|---|---|
| 4,086,485 A | 4/1978 | Kaplow et al. | |
| 6,297,740 B1 * | 10/2001 | Hill | G01J 1/0474 340/425.5 |
| 2008/0017784 A1 | 1/2008 | Hoot et al. | |
| 2008/0258051 A1 | 10/2008 | Heredia et al. | |
| 2011/0100419 A1 | 5/2011 | Maeda | |
| 2011/0174297 A1 | 7/2011 | Palmieri | |
| 2011/0273704 A1 | 11/2011 | Burba | |
| 2016/0146507 A1 | 5/2016 | Johnson et al. | |
| 2021/0389025 A1 | 12/2021 | Hines | |

FOREIGN PATENT DOCUMENTS

| | | |
|---|---|---|
| CN | 100573390 C | 12/2009 |
| CN | 101650173 A | 2/2010 |
| CN | 101662241 A | 3/2010 |
| CN | 101968656 A | 2/2011 |
| CN | 103345263 A | 10/2013 |
| CN | 106441214 A | 2/2017 |

(Continued)

OTHER PUBLICATIONS

International Search Report and Written Opinion of the International Searching Authority, Mailed Dec. 26, 2023, Corresponding to PCT/US2023/034054, 7 pages.

*Primary Examiner* — Thanh Luu
(74) *Attorney, Agent, or Firm* — Lewis Roca Rothgerber Christie LLP

(57) ABSTRACT

An indirect-view quad cell detector for sun tracking. In some embodiments, a system includes: a concentrating solar collector, having a nominal focus within a target region; an indirect-view first baffle element located near the focal plane; a first photodetector with an indirect view of a point in the target region via the indirect-view baffle; and a first aperture in the baffle providing a view of a first point in the target region to the first photodetector.

4 Claims, 18 Drawing Sheets

(56) References Cited

FOREIGN PATENT DOCUMENTS

| | | |
|---|---|---|
| CN | 206075149 U | 4/2017 |
| CN | 108444503 A | 8/2018 |
| CN | 110160486 A | 8/2019 |
| CN | 116625222 A | 8/2023 |
| EP | 2 593 759 B1 | 11/2020 |
| JP | 2004-146745 A | 5/2004 |
| KR | 10-2005-0020318 A | 3/2005 |
| KR | 10-0959078 B1 | 5/2010 |
| KR | 10-0988264 B1 | 10/2010 |
| KR | 10-2013-0022752 A | 3/2013 |
| KR | 10-1530979 B1 | 7/2015 |
| WO | WO 2009/132394 A1 | 11/2009 |
| WO | WO 2012/008659 A1 | 1/2012 |

\* cited by examiner

INDIRECT-VIEW QUAD CELL DETECTOR FOR SUN TRACKING

CROSS-REFERENCE TO RELATED APPLICATION(S)

The present application claims priority to and the benefit of U.S. Provisional Application No. 63/377,624, filed Sep. 29, 2022, entitled "INDIRECT-VIEW QUAD CELL DETECTOR FOR SUN TRACKING", the entire content of which is incorporated herein by reference.

FIELD

Some embodiments of the invention relate generally to the field of solar energy, specifically devices that concentrate sunlight. Concentrators generally require tracking systems, which generally comprise one or more sensors to sense the aim of the concentrated sunlight beam.

BACKGROUND

Solar trackers may be used to track the sun, e.g., in solar power systems. One of the challenges with tracking for concentrated solar systems is that, while it would be ideal to place a camera or other tracking sensor at the focus of the beam, the focus of a concentrating solar collector is generally not a viable place to put a sensor, since it is intentionally subjected to intense solar radiation.

Various techniques may be used for working around this problem. One approach involves placing sensors in the "halo" around the focal region, where they will receive less radiation, but also necessarily may not be as effective.

Another approach is to place a camera at some distance from the focal plane and take images of the focal plane, thus inferring the incident illumination pattern; however camera systems are more expensive than simpler sensors.

One technique for tracking non-solar sources is a quadrant photodiode, where four photodiodes are provided in the region of the target, where they detect illumination patterns in the target region, allowing the calculation of pointing error. Quad cell detectors tend to be useful in systems where illumination levels are low or modest. But it is very difficult to provide a quadrant photodiode that can be placed at the focus of a solar concentrator and survive.

A related quadrant detector technique uses optical fibers that capture incident sunlight in a region of interest and forward the energy to remote photodetectors; the fibers in such a system are still exposed to intense solar radiation.

A related detector technique, described in US patent application 2021/0389025 [hereafter referred to as '025], provides a set of viewing "straws" to view a focal plane of interest, embodying the properties of a quadrant photodiode, but with the standoff distance characteristic of an imaging camera.

The straw technique is useful, but some types of tracking mechanisms may make it difficult to find a location for the straws.

One related technique for measuring the intensity of a light source involves the use of an integrating sphere, which tends to diffuse light incident from a source and also optionally can help to reduce the intensity of the light reaching the detector.

Referring to FIG. 9 of '025, for some tracking mechanisms, such as those that may tend to articulate, it would be desirable to provide an indirect-view detector whose components are away from the region defined by converging ray cone 9.

SUMMARY

According to an embodiment of the present invention, there is provided a system including: a concentrating solar collector, having a nominal focus within a target region; an indirect-view first baffle element located near the focal plane; a first photodetector with an indirect view of a point in the target region via the indirect-view baffle; and a first aperture in the baffle providing a view of a first point in the target region to the first photodetector.

In some embodiments, the first baffle is configured to shield the first photodetector from direct light rays incident from optics directing light to the target region.

In some embodiments, the system further includes: a second photodetector with an indirect view of a second point in the target region via a second indirect-view baffle, the second point being a different point from the first point; and a second aperture in the baffle providing a view of a second point in the target region to the second photodetector.

In some embodiments: the first photodetector is exposed, through the first aperture, to light striking a first portion of the target region, the first portion of the target region including the first point; and the second photodetector is exposed, through the second aperture, to light striking a second portion of the target region, the second portion of the target region including the second point.

In some embodiments, the first and second target regions are distinct and do not overlap.

In some embodiments, surfaces within the indirect-view baffle prevent light from the second target region from reaching the first photodetector, and likewise prevent light form the first target region from reaching the second photodetector.

In some embodiments, the system further includes: a third photodetector with an indirect view of a third point in the target region via a third indirect-view baffle, the third point being a different point from the first point and from the second point; and a third aperture in the baffle providing a view of a third point in the target region to the third photodetector; a fourth photodetector with an indirect view of a fourth point in the target region via a fourth indirect-view baffle, the fourth point being a different point from the first point and from the second point and from the third point; and a fourth aperture in the baffle providing a view of a fourth point in the target region to the fourth photodetector.

In some embodiments, the first baffle includes an outer shell and an inner diffusing surface.

In some embodiments: the photodetector includes: an optical fiber, and a photosensor, wherein the optical fiber has: a proximal end configured to receive light, from the first point, through the first aperture, and a distal end, configured to couple light to the photosensor.

According to an embodiment of the present invention, there is provided a system including: a concentrating solar collector, having a nominal focus within a target region; a first photodetector; a first aperture in the target region; and a first diffusing element, wherein the system is configured to direct solar light entering the first aperture to propagate to the first photodetector via a first optical path, the first optical path including the first diffusing element.

In some embodiments, the system includes a first optically sealed cavity having the first aperture as an input aperture, and an exit port as an output, wherein the first diffuse reflector is an interior surface of the first optically sealed cavity.

In some embodiments, the system further includes a first transparent waveguide, wherein the optical path further includes a path through the first transparent waveguide.

In some embodiments, the system further includes: a second photodetector; a second aperture in the target region; a second diffusing element; a third photodetector; a third aperture in the target region; and a third diffusing element, wherein the system is further configured: to direct solar light entering the second aperture to propagate to the second photodetector via a second optical path, the second optical path including the second diffusing element; and to direct solar light entering the third aperture to propagate to the third photodetector via a third optical path, the third optical path including the third diffusing element.

In some embodiments, the first aperture is adjacent to a glass rod.

DETAILED DESCRIPTION

Some embodiments of the invention relate to apparatus and methods to provide a tracking sensor for a concentrating solar energy collection system. Whereas the application of some embodiments of the invention disclosed herein is presented in the contexts of solar concentrating systems and of concentrating solar power, the apparatus and methods are generally applicable to any system in which it is desirable to sense the aim of an intense radiation source.

From the background description above, it can be seen that some tracking sensors for concentrating solar systems face challenges that may make them difficult or costly to implement, or suboptimally effective.

The present disclosure discloses a method and apparatus for a tracking sensor that is especially useful for sensing the aim of an intense radiation source, by combining the light-diffusing and attenuation features of an integrating sphere with the low cost of a simple quadrant photodiode (or "quad cell"). With an intense radiation source, the light scattered from the target region is sufficiently bright to be readily observed by a remotely positioned photodetector, with a phototransistor being a good choice in many applications.

An embodiment of the invention thus includes four photodetectors, including devices such as photodiodes or phototransistors or photoresistors. But unlike the photodiodes of a classic quadrant photodiode, the photodetectors are safely placed at a location away from the focus of the solar concentrating system, and view the target region indirectly via a series of diffuse reflections which may tend to attenuate the intensity of the light striking the photodetectors.

Figure 1:
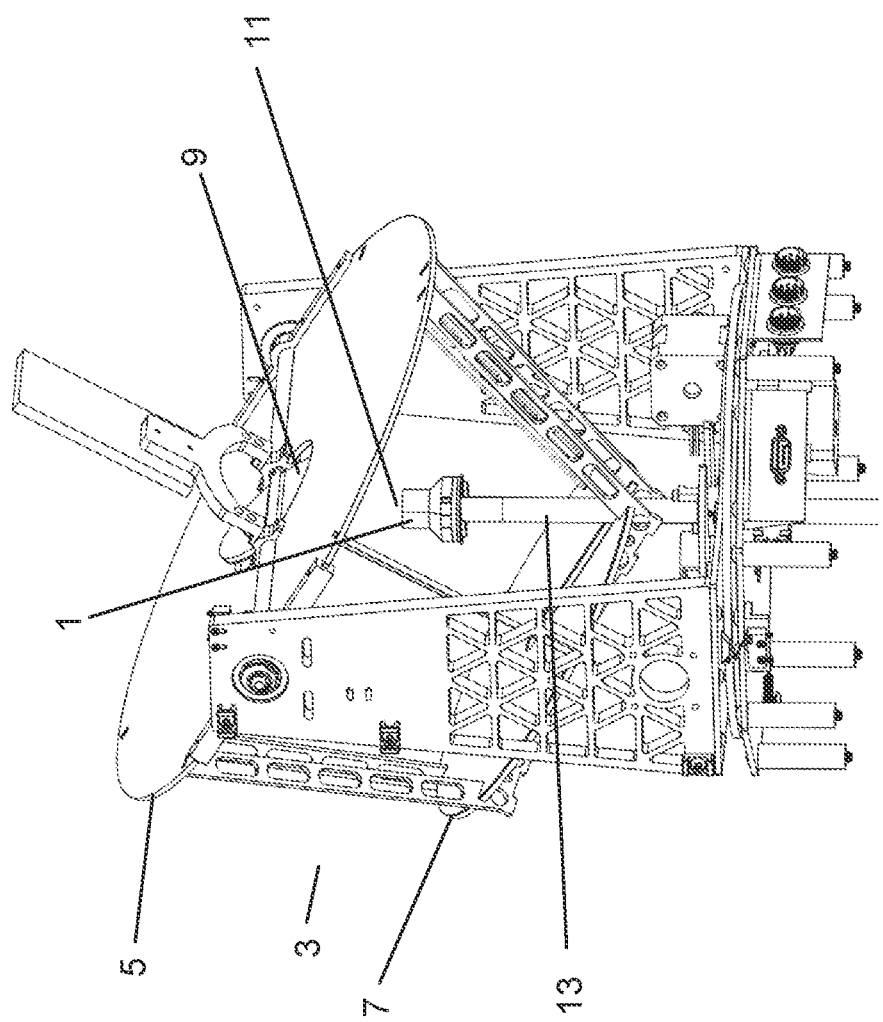
FIG. 1 shows an exemplary solar concentrating collector that includes the present invention.

Referring to FIG. 1, the embodiment further includes a composite baffle element 1, which, while exposing the photodetectors to light from the target region, will tend to thoroughly "stir" light that strikes a target region near the focus 11 of the system. This desirably tends to expose the photodetector to the average intensity of light entering an aperture of the baffle near the target region.

As used herein, the "target region" is the region, around the nominal focus, including the desired focal region as well as the region into which light spills when the converging beam is mispointed. One skilled in the art will appreciate that the terms "focal region" or "focal plane" may tend to be used by optical engineers concerned with the behavior of the converging beam, while the term "target region" may tend to be used be controls engineers concerned with controlling the aim of the converging beam, and of sensing the converging beam when mispointed; all three terms have similar meaning but one may be selected over the other based on context.

In this embodiment, the target region includes a composite baffle element 1, which includes a plurality of apertures, which tend to propagate and scatter a portion of the radiation impinging in the target region towards a photodetector as indirect radiation. The photodetector can sense the brightness of this diffuse indirect radiation, and thus infer the intensity of the radiation impinging on the corresponding baffle aperture, by observing the indirect radiation scattered from the diffuse surfaces comprising the composite baffle element. If an appropriate composite baffle element is provided, the measurements from the four photodetectors approximate the measurements that would be made by a quad cell located in the target region, but the photodetectors are safe from damage.

In one embodiment, the composite baffle element includes aperture openings that permit tailoring of the exact field of view of each of the photodetectors.

In one embodiment, the light entering the aperture undergoes at least two diffuse reflections before reaching one of the photodetectors.

In one embodiment, the photodetectors are included in an electronic assembly which includes one or more amplification stages, and the amplified photodetector signals are provided as the inputs to one or more analog-to-digital converters, which may be read by a digital computer or microcontroller. The computer or microcontroller then may use the measured light intensity information to help aim the solar concentrator at the sun.

The systems, apparatus, and methods presented herein describe a tracking sensor for a solar energy collection system with proximal concentrating optics. Embodiments described herein are exemplary and do not represent all possible embodiments of the principles taught by the invention. In particular, embodiments of the invention have direct application in the fields of concentrating solar power and solar thermal heating. Nevertheless, the apparatus and methods described herein can be applied and adapted by those skilled in the art for use in any alternative application, for example an application that requires aiming of an intense light source.

Several terms have been used throughout this document, and this paragraph recaps their meaning. An "aperture" comprises an opening in a composite baffle, constraining a detector to view a particular portion of the target region. The "target region" is the region (often a plane, but it does not have to be a plane) where the focus of the concentrating system is achieved. The word "region" used by itself may refer to the entire target region, or to a portion of it. The terms "scattering" and "diffusion" refer to a process which turns a single incident ray of light into a cone of diffuse rays. Scattering may occur either upon reflection from a surface (e.g. a flat white surface) or upon transmission through a surface (e.g. frosted glass). Terms including "indirect illumination", "indirect radiation", "indirect light", "scattered light", "scattered radiation", "scattered rays", "diffuse rays", "diffuse reflection", and "indirect rays" refer to this diffuse illumination produced by a scattering surface. However, when a diffuse or scattered ray hits yet another surface and further scatters in a non-useful way, the resulting rays are considered "stray light" and are not intended to be included in our definition of indirect illumination. "Specular" reflections and rays, by contrast, refer to direct rays that reflect from a surface, wherein the angle of reflection of the ray is substantially equal to the angle of incidence, and wherein each incident ray produces a single reflected ray (with the caveat that no real-world reflection is truly specular—there is always a small diffuse reflection as well). The internal reflections of rays within an optical fiber are not considered diffuse or indirect reflections—the internal reflections inside a fiber are actually direct and highly specular—the path of a given ray can be readily followed from input to output; rays do not generally scatter and diffuse inside a fiber.

Referring again to FIG. 1, an exemplary sun-tracking solid state solar thermal energy collection system 3 includes a focusing Fresnel lens 5, a primary reflector 7, and a secondary reflector 9, aimed at a target region 11. In this exemplary system, the target region 11 comprises a glass rod 13 that can conduct solar radiation incident at the target plane to a desired location below the collector.

Figure 2:
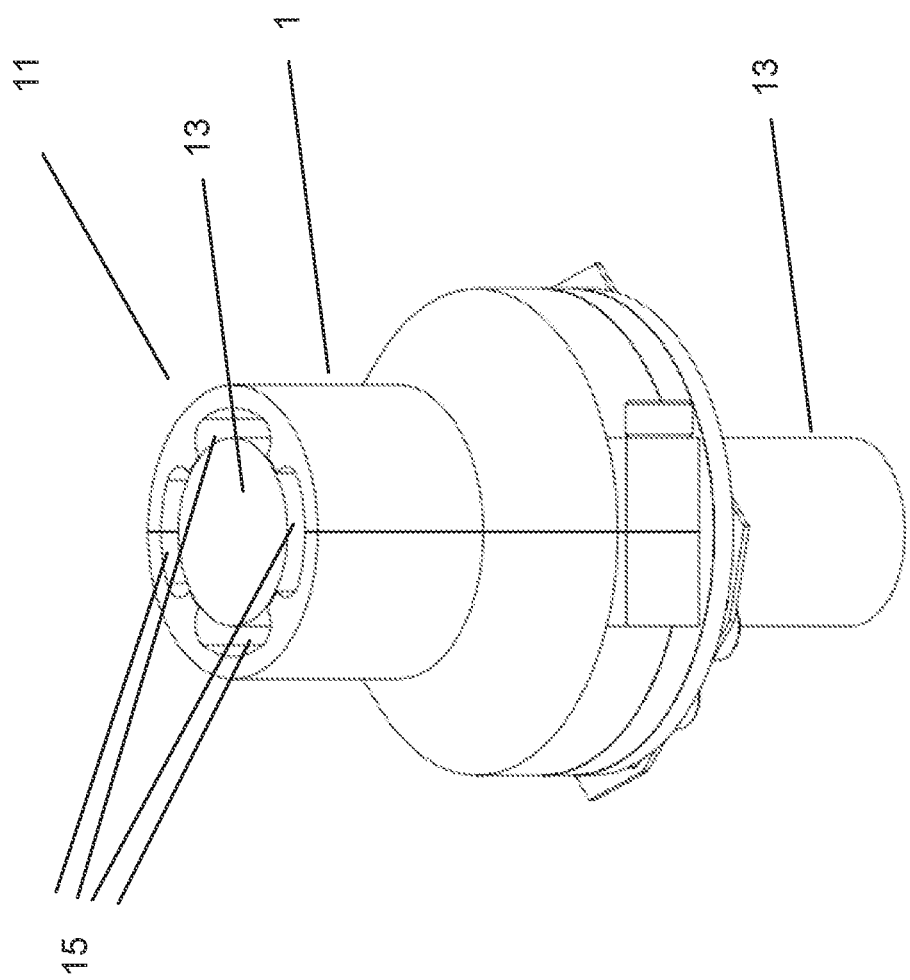
FIG. 2 shows an exemplary indirect-view quad cell detector assembly according to the present invention.

When the system is desirably tracking the sun, as focused sunlight impinges on target region 11, the majority of the collected light may be coupled into glass rod 13. However, some light may tend to miss rod 13. Referring to FIG. 2, light may impinge on apertures 15 of composite baffle element 1.

In order to help implement a tracking system that keeps concentrator system 3 correctly aimed at the sun, it is desirable to provide a sensing system that can measure the pointing error. A tracking algorithm can then use that error information to actuate motors to correct the aim of the collector 3 so as to help bring the focus back to the desired aim point 11.

Some embodiments of the present invention provide a pointing sensor that can provide the pointing error measurement required by concentrator system 3. FIG. 2 shows an embodiment of the invention included in system 3. The figure shows the same system that was shown in FIG. 1, but parts have been removed to show just the elements related to tracking.

Referring to FIG. 2, in the embodiment shown, the tracking sensor comprises a composite baffle element 1 which includes four apertures 15 which surround the desired system aimpoint 11, which has glass rod 13 at its center.

Each of the apertures 15 tends to propagate light entering its aperture to a photodetector associated with the aperture, thus helping to measure the amount of light entering each aperture 15.

Figure 3:
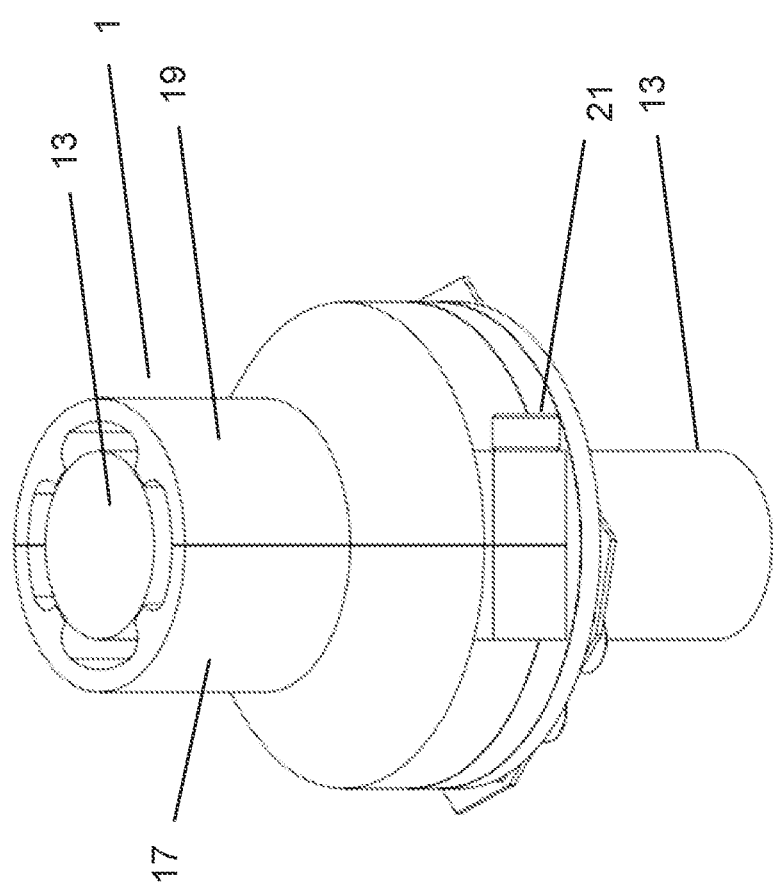
FIG. 3 is a view of an embodiment of the present invention comprising clamshell halves.

In one embodiment, as shown in FIG. 3, the composite baffle element 1 comprises two clamshell halves 17 and 19, together with a clamping screw 21. Other embodiments may comprise other subassemblies that provide composite baffle element 1.

Figure 4:
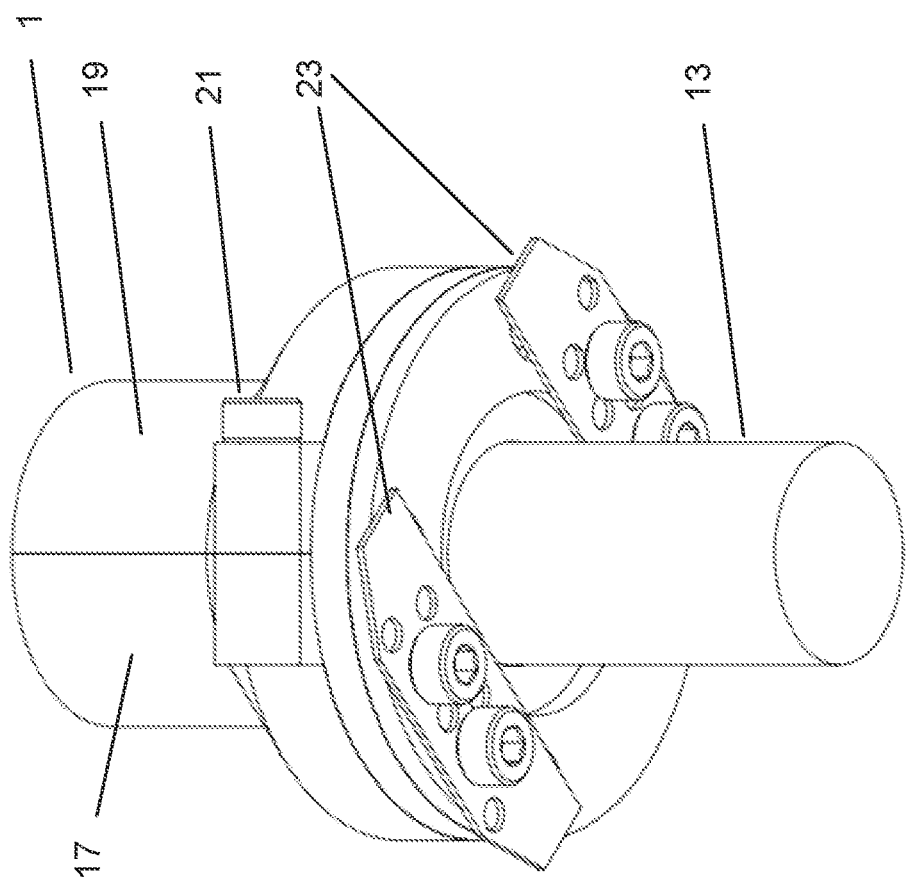
FIG. 4 is a view of an embodiment of the present invention showing electronic photodetector boards at the optical exit of the indirect-view quad cell detector assembly.

FIG. 4 is a view of the detector from below, showing composite baffle element 1 with a pair of small detector boards 23 attached. Referring to exploded FIG. 5, detector boards 23 each include photodetectors 25 which may be configured to sense the light entering an associated aperture 15. In other embodiments, detectors 25 may be on a single detector board, or on individual detector boards, or on any number of detector boards, and embodiments may include any number of detectors greater than two.

The embodiment shown in the figure includes two detector boards, matching the two clamshell halves of the embodiment, but any number of detector boards may be used.

Figure 5:
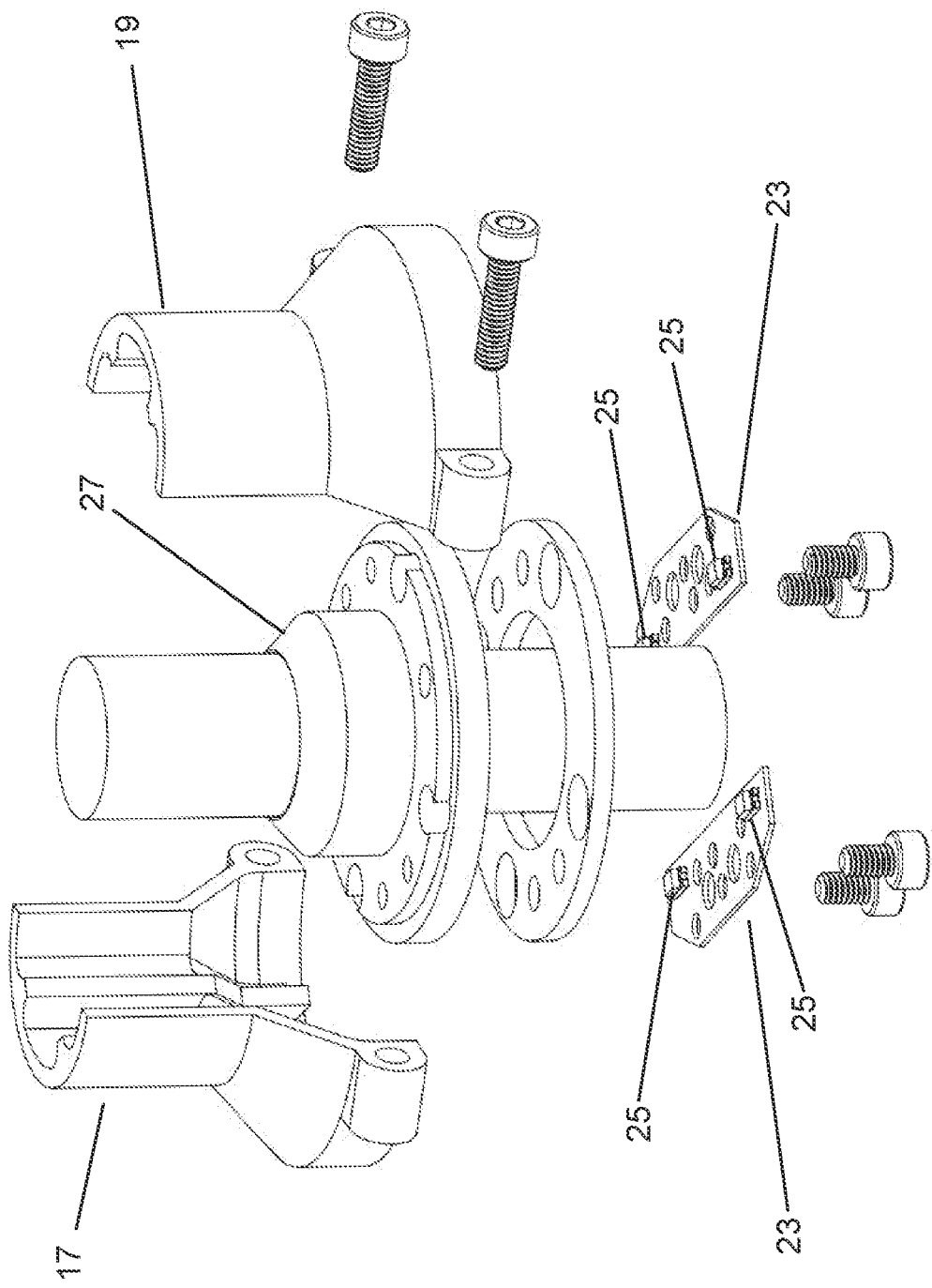
FIG. 5 is an exploded view of an embodiment of the present invention, revealing the photodetector boards and their associated photodetectors.

In exploded FIG. 5, glass rod 13 has been suppressed so that we can see the internal elements of composite baffle element 1. In addition to clamshell halves 17 and 19, composite baffle element 1 includes primary diffuser 27.

Primary diffuser 27 tends to help provide an additional surface off of which incident rays must reflect and diffuse prior to reaching the detectors 25.

Figure 6:
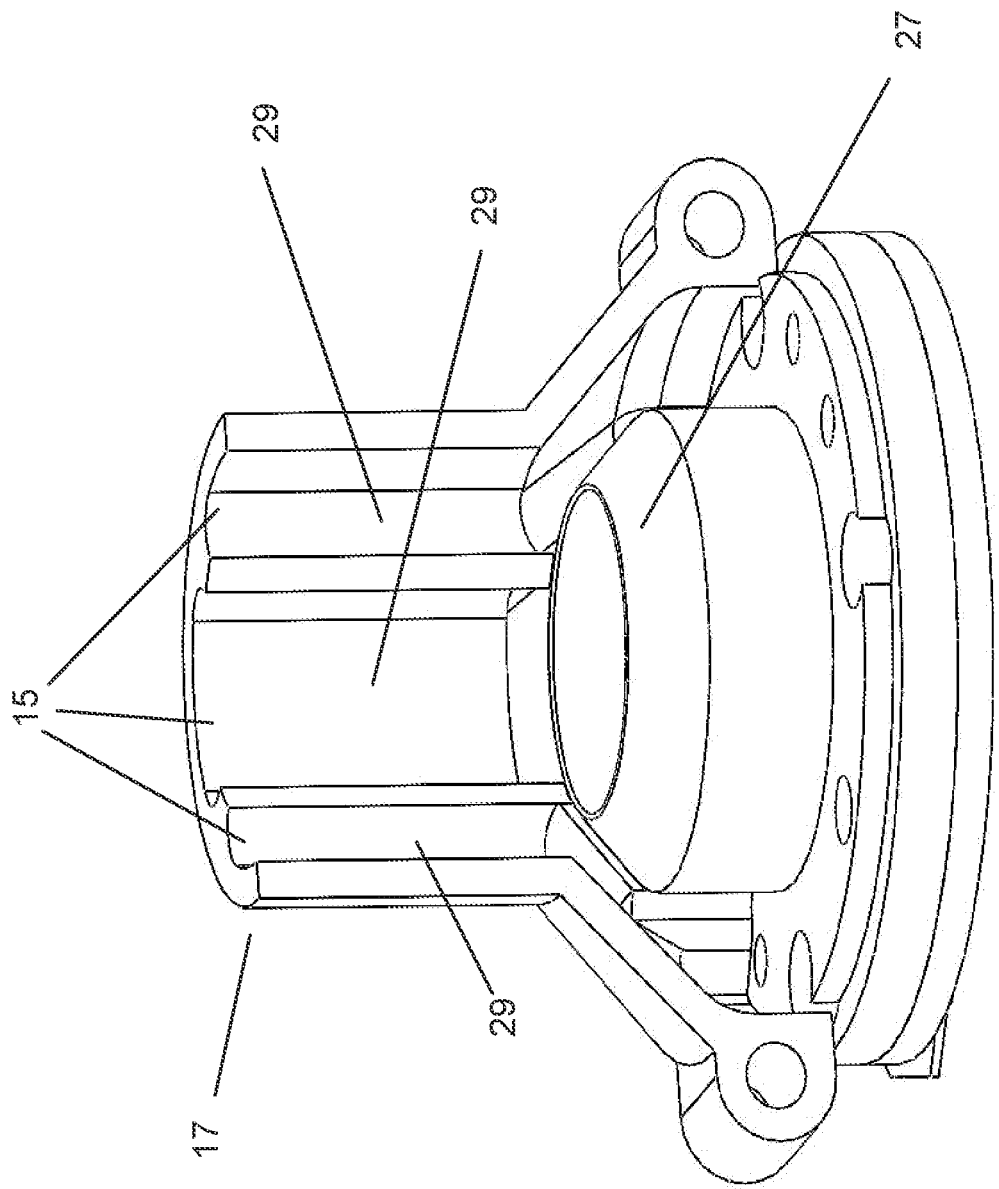
FIG. 6 is a cutaway view, revealing the internal structure of the composite baffle element, including an internal diffusing surface element.

FIG. 6 is a cutaway view, showing how primary diffuser 27 nestles within clamshell half 17 of composite baffle element 1. From the figure, one can see that apertures 15 are provided as inputs to cavities 29, which tend to trap, diffuse, and reflect rays entering aperture 15. The partitions separating the cavities 29 are optically sealed against, or separated by a small gap from, the glass rod 13 and the primary diffuser 27, to avoid excessive leakage of light between the cavities. To help enhance diffusion, some embodiments may include a transmissive diffusing element, such as a piece of frosted glass, at the input of aperture 15, or within cavities 29.

Embodiments may also use any convenient approach for sealing off optical cavities from one another, helping any individual photodetector to only receive illumination from its associated input aperture. The notion of an "optically sealed cavity" is intended to refer to a region that has an optical input aperture and an optical exit port, with substantially no other way for light to enter or exit the cavity.

Figure 7:
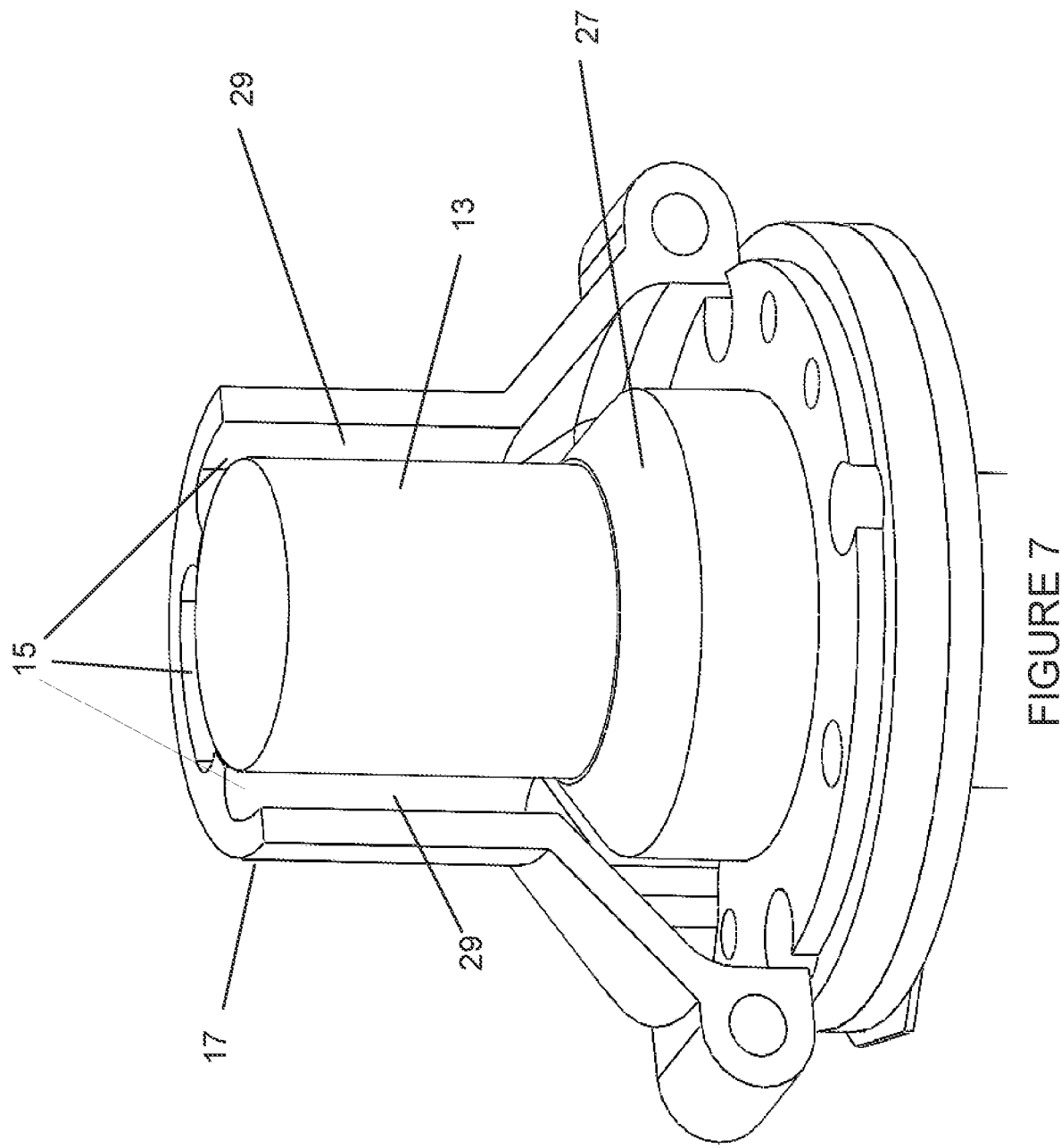
FIG. 7 is a similar cutaway view as FIG. 6, but also showing the glass rod in the center.

FIG. 7 is the same view as FIG. 6, but with the glass rod 13 shown.

Figure 8:
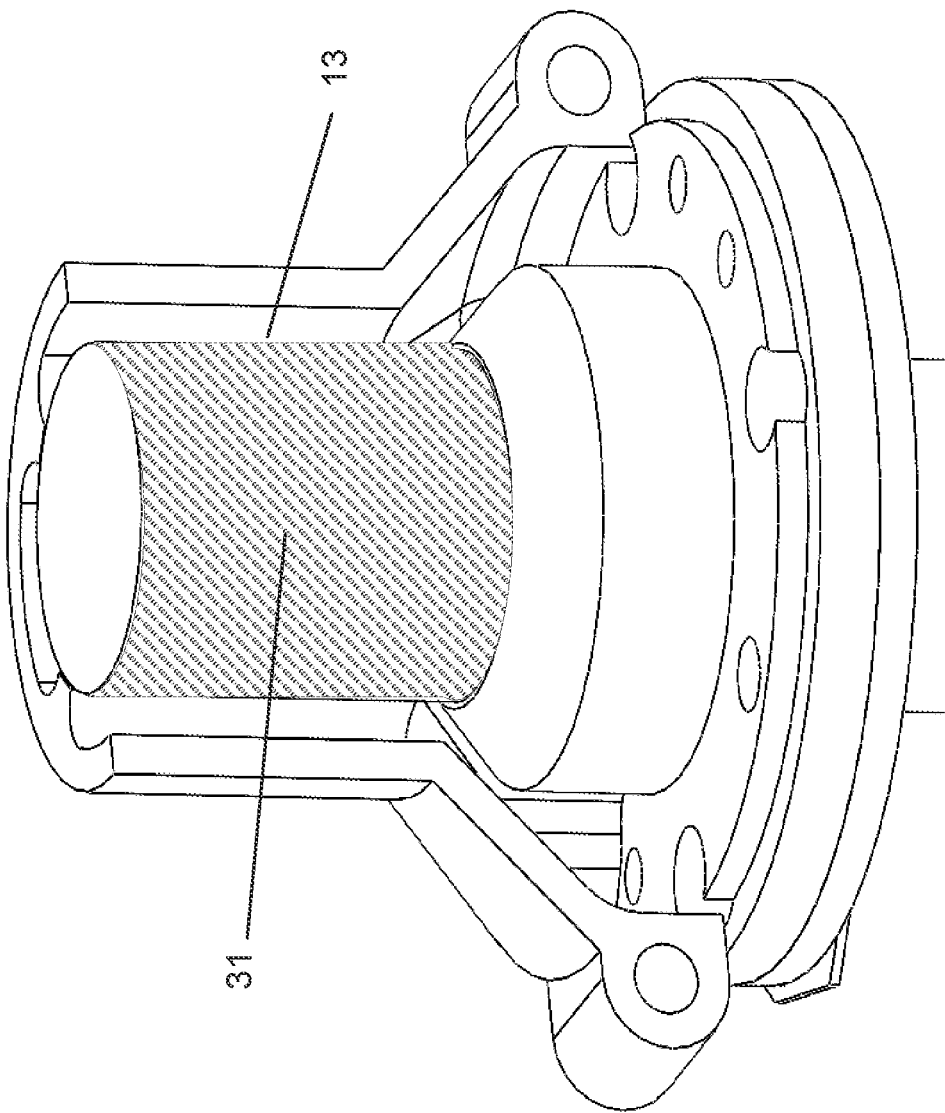
FIG. 8 is a similar view to FIG. 7, but also showing a diffuse or specular reflective coating on the surface of the tip of the glass rod.

Referring to FIG. 8, in many embodiments, the portion of glass rod 13 that is enclosed within composite baffle element 1 may be coated with a white or metallic coating 31, which helps to constrain rays that enter a given aperture 15 to remain within the corresponding cavity 29. One or more (e.g., all) of the other surfaces (in addition to the outer surface of the glass rod 13) from which light may reflect in traveling to the detector 25 (e.g., the surface of the primary diffuser 27 and the interior surfaces of the cavities 29) may also be covered with a white coating.

Figure 9:
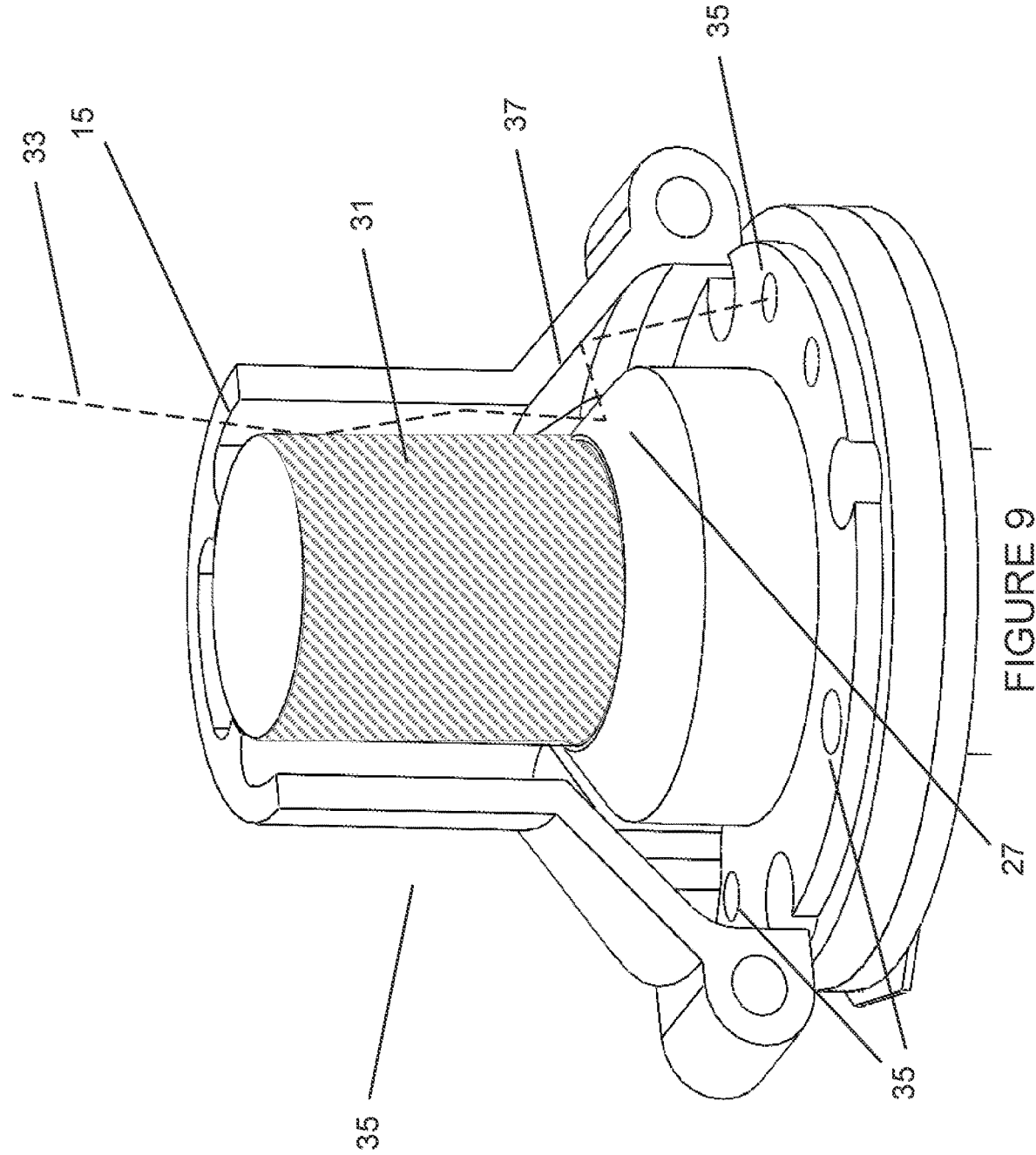
FIG. 9 shows the path of a light ray through the indirect-view quad cell detector.

FIG. 9 shows an exemplary path of a ray 33 within composite baffle element 1, eventually reaching a detector 25 via exit aperture 35. The ray shown is a specular ray impinging off of diffuse surfaces 31, 27, and 37 on its way to aperture 35. However, one skilled in the art will appreciate that each reflection shown may be a diffuse reflection, and many diffuse rays may enter exit aperture 35 via myriad paths.

Many other useful embodiments exist in addition to the exemplary embodiments shown so far. For example, embodiments may include any useful detector, not just phototransistors. Photodiodes, photoresistors, or any other useful light sensing device may be used in place of the phototransistors 25 of the exemplary embodiment of FIG. 2.

In some embodiments, a photodetector includes a transparent waveguide, e.g., an optical fiber, that routes the light received by the photodetector at a proximal end of the optical fiber to the sensing device at a distal end of the fiber. In this context the sensing device (which may be, e.g., a photodiode, a phototransistor, or a photoresistor) may be referred to as a "photosensor" to distinguish it from other elements (e.g., the fiber) of the photodetector. The term "photodetector", as used herein, includes a photosensor as a special case; as such, a photodetector may include a fiber and a photodetector (the latter being, e.g., a photosensor). In one embodiment, optical fibers are provided at the locations of one or more of the photodetectors 25 of FIG. 5, and the corresponding photodetectors 25 are moved to a different location. In this embodiment, the fiber(s) transport the light from the original photodetector location(s) to the new photodetector location(s) (e.g., the locations of the photosensors), where the light may be sensed by the photodetector(s).

While the figures have shown four apertures/detectors, any convenient number may be used. The quad-cell-mimicking exemplary embodiment can be more generally described as viewing four equal regions, each region comprising a portion of a circle with an angle of 90 degrees. Any number of apertures may be used. In some embodiments, three or more apertures are used, to independently solve for x and y pointing errors.

An embodiment may choose to overlap the region of view of one or more of the detectors. An embodiment may use apertures of any convenient shape, including but not limited to rectangular, circular, or any convenient shape.

Thus other embodiments may use 3, 5, or any useful number of apertures. By offsetting the apertures from the focal plane, a degree of overlap may be achieved if desired. By way of example, using eight 90-degree overlapping apertures would provide a system that could continue to function even if one of the sensors failed.

Some embodiments may include, instead of or in addition to the aperture included in composite baffle element 1, one or more masks at one or more various positions at or near target plane 11.

Some embodiments may provide composite baffle element 1, including internal diffusing surface 27, as a single component.

Some embodiments may provide detectors at places other than at exit ports 35.

Embodiments may use partially reflective (that is, somewhat specular) interior surfaces, within limits. That is, the interior surfaces need not be 100% diffusive. In one embodiment, a somewhat specular internal surface may be used, exhibiting, by way of example, up to 30% specular reflectance at wavelengths at which the detector is sensitive (e.g. 400-1100 nm for a typical silicon detector), and at least 20% hemispherical diffuse reflectance at those wavelengths. These values are presented as examples only; any useful ratios may be used, as long as there is sufficient diffuse reflection for the detectors 25 to not be confused by specular "glints". Each path that a ray of light may take from an input aperture (of an optically sealed cavity leading to a photodetector) to an exit port of the optically sealed cavity includes at least one reflection from or transmission through, a diffusing element. A "diffusing element" as used herein, has a specular reflectance (or a specular transmittance) less than a set value. The set value may be between 0.001% and 50.000%.

Figure 10:
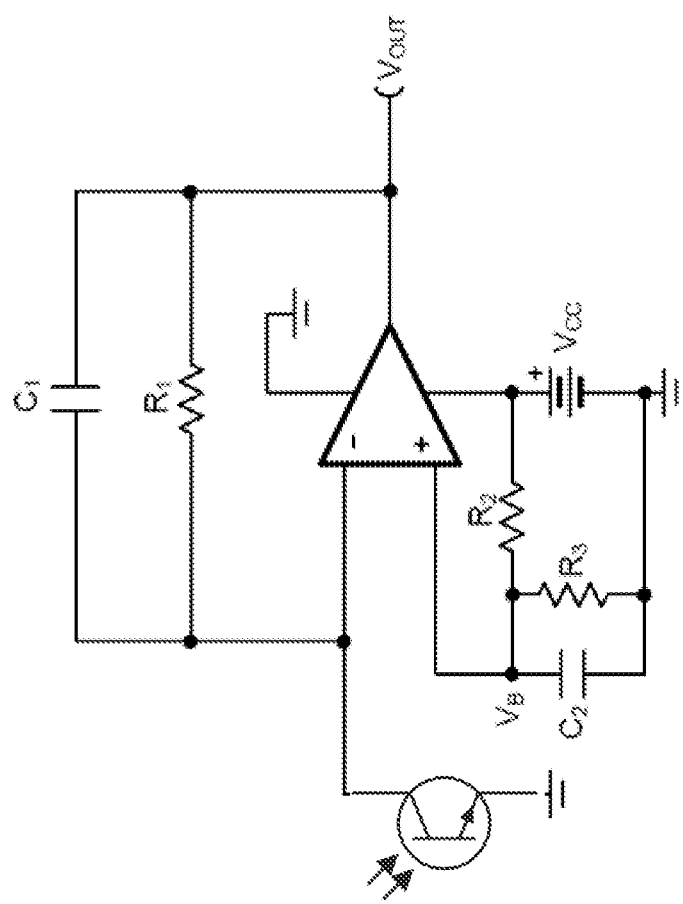
FIG. 10 is the circuit used to convert phototransistor current to voltage, in some embodiments.

For a system such as the exemplary embodiment of FIG. 2, the signals from the four photodetectors may be amplified using standard techniques and then digitized with an analog-to-digital converter such as those included in common microcontrollers. The exemplary embodiment includes the circuit shown in FIG. 10 which converts the phototransistor current into a voltage, using an MCP6004 operational amplifier.

Figure 11:
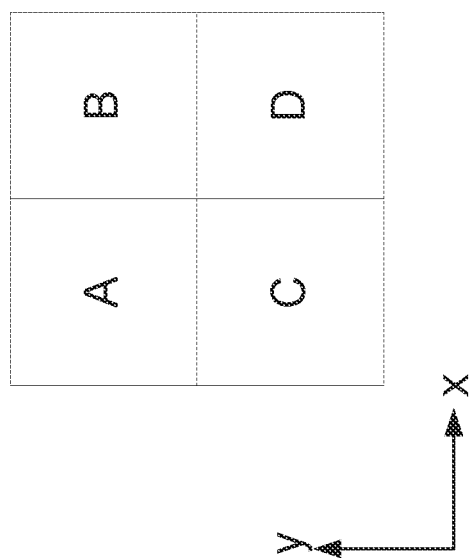
FIG. 11 shows the layout of quad cell quadrants and x-y coordinates used to convert from detector readings to x-y pointing error, in some embodiments.

Once converted into digital counts, conversion into x and y error signals follows standard quad cell techniques. A background level is measured and recorded when the system is not aimed at the sun. When aimed at the sun, we read each of the four quadrants, then the background level is subtracted from each to form four background-corrected signals A, B, C, and D (corresponding to the quadrants shown in FIG. 11). The resulting four values are converted to x and y pointing error using the expressions $$x = \frac{(B+D)-(A+C)}{A+B+C+D}$$

$$y = \frac{(A+B)-(C+D)}{A+B+C+D}$$

While this specification uses the terms "quad cell" and "quadrant" throughout, and while the expressions in the equations above refer to four detector readings, any number of detectors may be used that are useful, including as few as three and as many as eight or even more than eight.

Indeed, some embodiments may include two photodetectors or even just one photodetector. A single photodetector can help to enable intensity-based tracking (for example, by tracking to a peak of intensity or to a set intensity), while two detectors can provide a single-axis tracking signal.

By way of example, one embodiment of a solar energy collection system may include two or more solar collector assemblies 3, which may be mechanically ganged together. In such an embodiment, two detectors may be included in one solar collector assembly, helping to measure tracking error in one axis, while an additional two detectors may be included in the second solar collector assembly, helping to measure tracking error in the other axis.

In some embodiments the detector may be used with additional sensor components such as limit switches, potentiometers, and up-looking detector systems to increase the system's awareness of its state.

Figure 12:
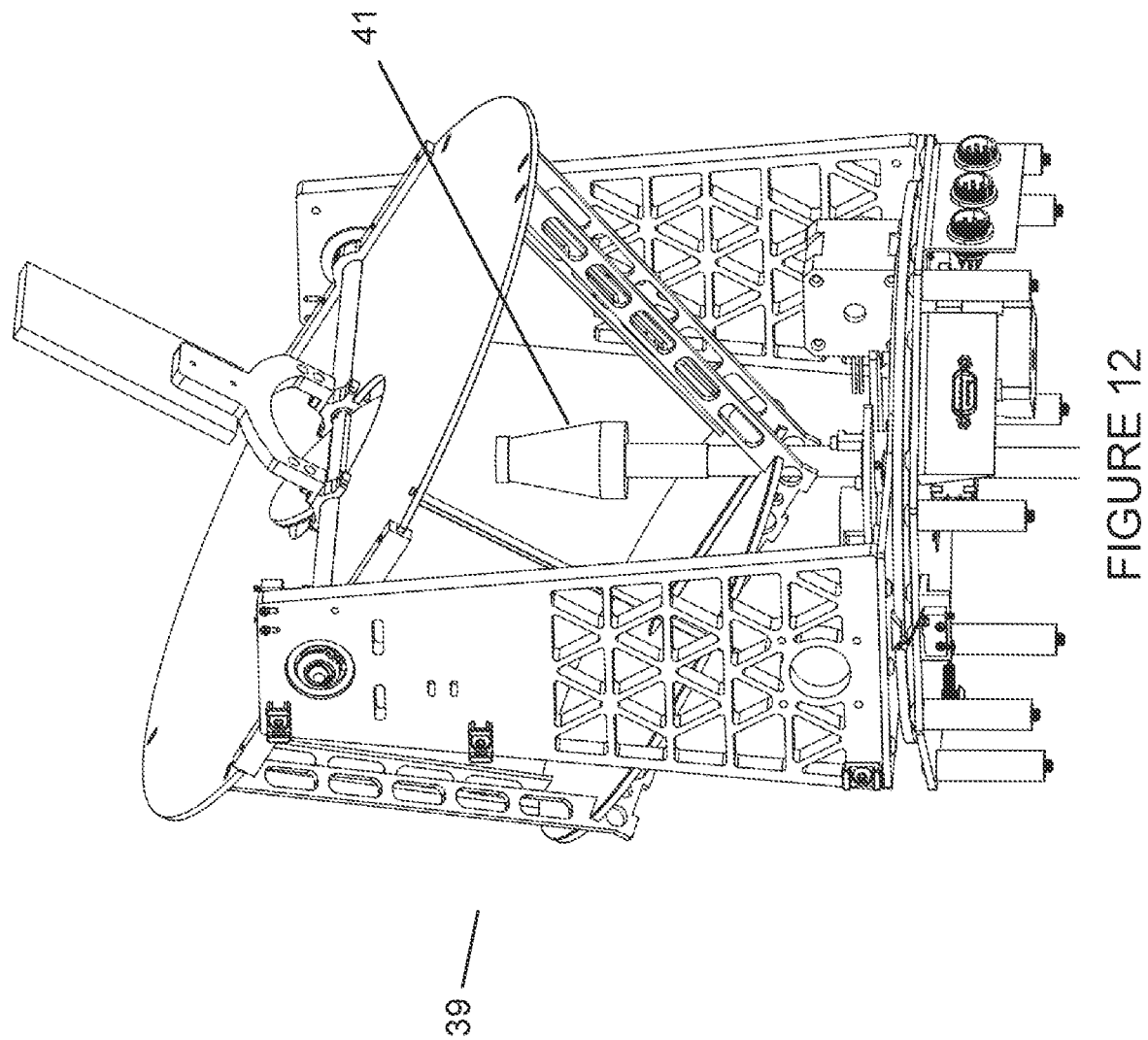
FIG. 12 shows an exemplary solar concentrating collector that includes a nozzle-shaped composite baffle assembly.
Figure 13:
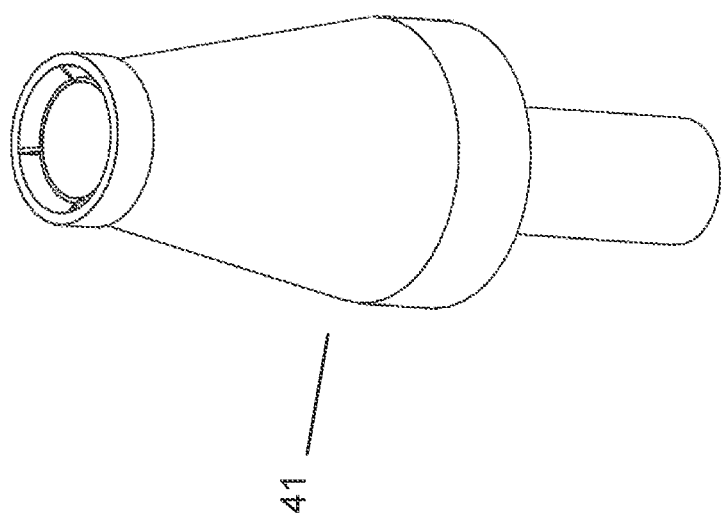
FIG. 13 is a view of a nozzle-shaped composite baffle assembly by itself.
Figure 14:
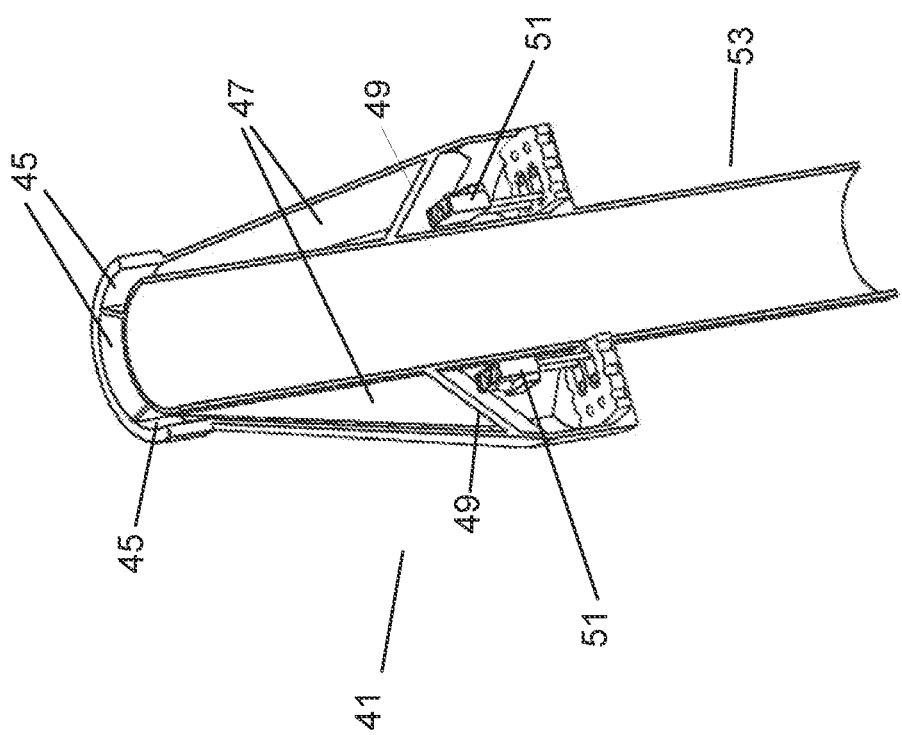
FIG. 14 is a cutaway view of a nozzle-shaped composite baffle assembly revealing the internal structure, including diffusing umbrella elements and photodetectors.

Embodiments may use any convenient mechanical shape for the composite baffle. FIG. 12 shows another exemplary solar collector 39 that is identical to the collector 3 of FIG. 1, except that composite baffle 1 has been replaced by composite baffle 41, which has a shape the looks like the nozzle of a garden hose. FIG. 13 shows composite baffle 41 by itself, and FIG. 14 shows a cutaway view of composite baffle 41, showing input apertures 45, cavities 47, diffusing "umbrella" elements 49, and photodetectors 51. Sleeve 53 provides for convenient mounting to the collector's glass rod. Note that the cutaway shows only half of each umbrella element 49. The full umbrella element resembles the apex roof of a house, sheltering the detector from specular rays.

Such an embodiment may allow for components to be included that cannot tolerate the high temperatures that are present near the target region, by placing the parts near the bottom of composite baffle 41. In the embodiment of FIG. 14, distance helps to permit the inclusion of discrete detector components 51 which include plastic housings.

Referring together to FIG. 7 and FIG. 14, one skilled in the art will appreciate that it may be desirable for sleeve 53—or any other part of any of the composite baffle elements—to have minimal physical contact with glass rod 13, as one skilled in the art will appreciate that points of contact may create locations where the desirable total internal reflection properties of glass rod 13 may be compromised, allowing valuable concentrated sunlight to escape from glass rod 13.

Some embodiments thus attempt to minimize contact between sleeve 53, or any other interior surface of the composite baffle element, with the glass rod by including point-like or line-like structures to help provide a standoff distance. By way of example, in one embodiment, sleeve 53 includes a set of inwardly-raised dimples to help provide a standoff distance. These dimples may tend to have a point-like contact with glass rod 13, thus minimizing light loss.

Other embodiments may include a line-line contact, such as an indented groove that spirals the length of sleeve 53.

Figure 15:
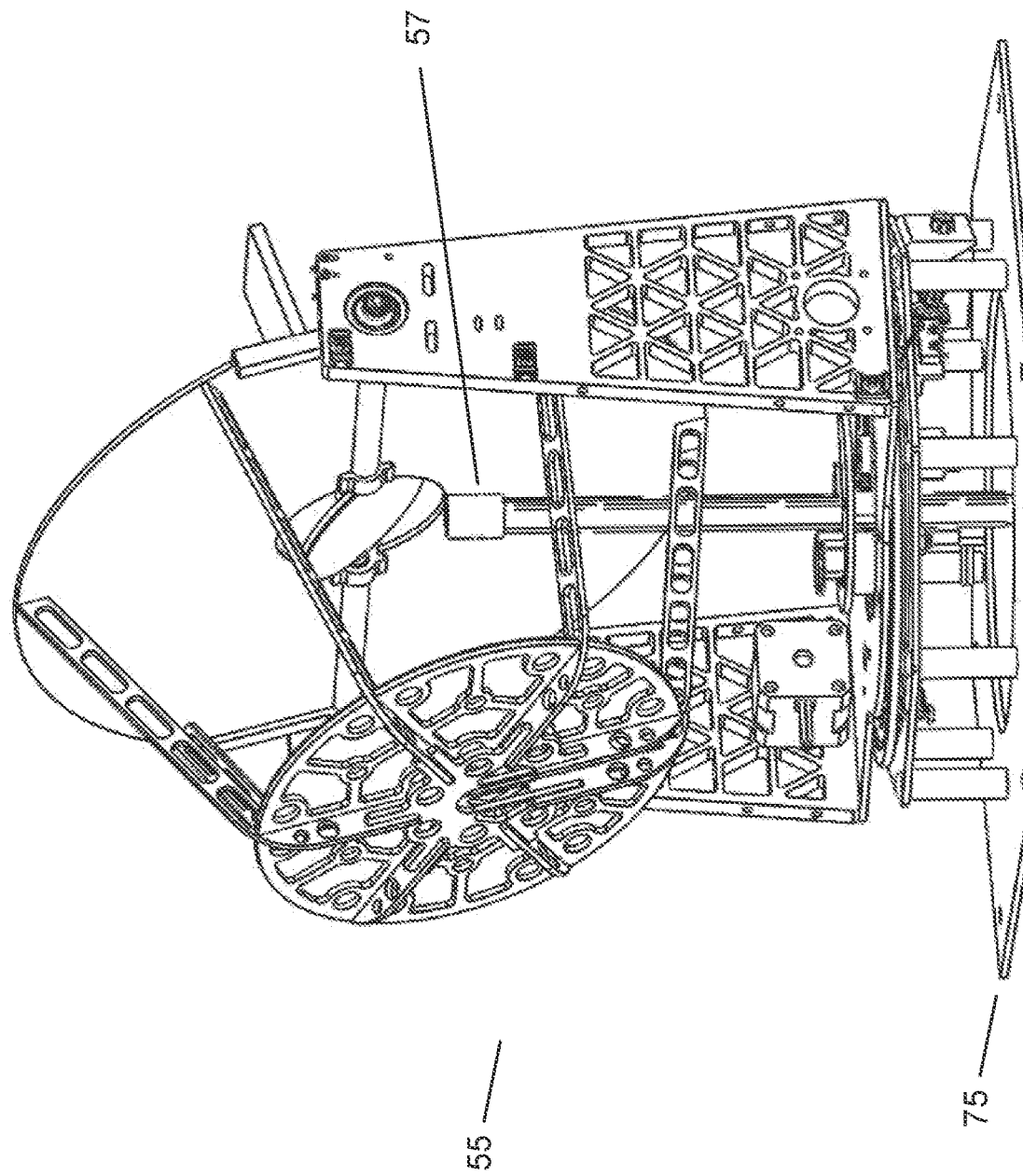
FIG. 15 shows another type of composite baffle element that includes internal vanes and optical-fiber-like glass rods.
Figure 16:
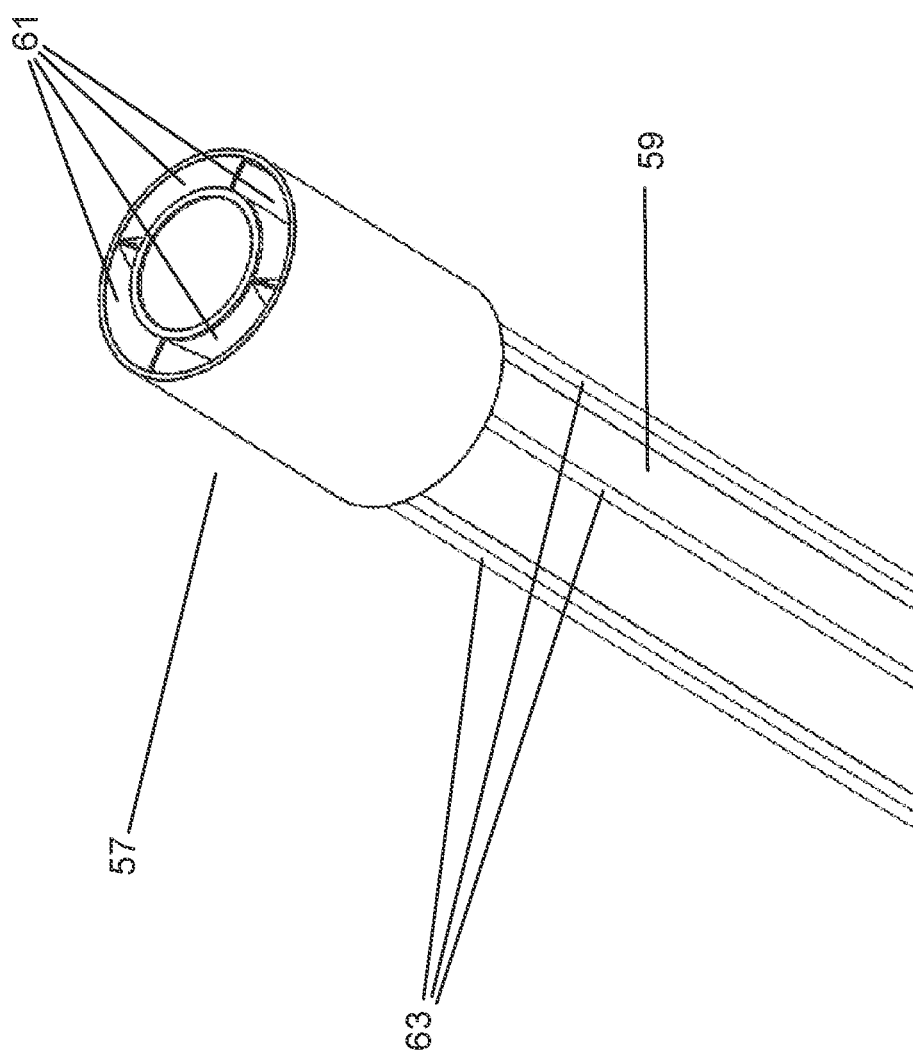
FIG. 16 is a close-up of the composite baffle element of FIG. 15, showing the input apertures and the optical-fiber-like glass rods.

Other embodiments may place the detectors yet further from the target region. FIG. 15 shows another exemplary solar collector 55 that is identical to the collector 3 of FIG. 1, except that composite baffle 11 has been replaced by composite baffle 57. Also called out in the figure is the bottom deck 75 of the collector, which is discussed below. FIG. 16 shows composite baffle 57 mounted to its associated glass rod 59. Its input apertures 61 are visible in this figure. FIG. 16 also shows a feature not present in the embodiments of the earlier figures, transparent waveguides which are "optical-fiber-like" glass rods 63.

Figure 17:
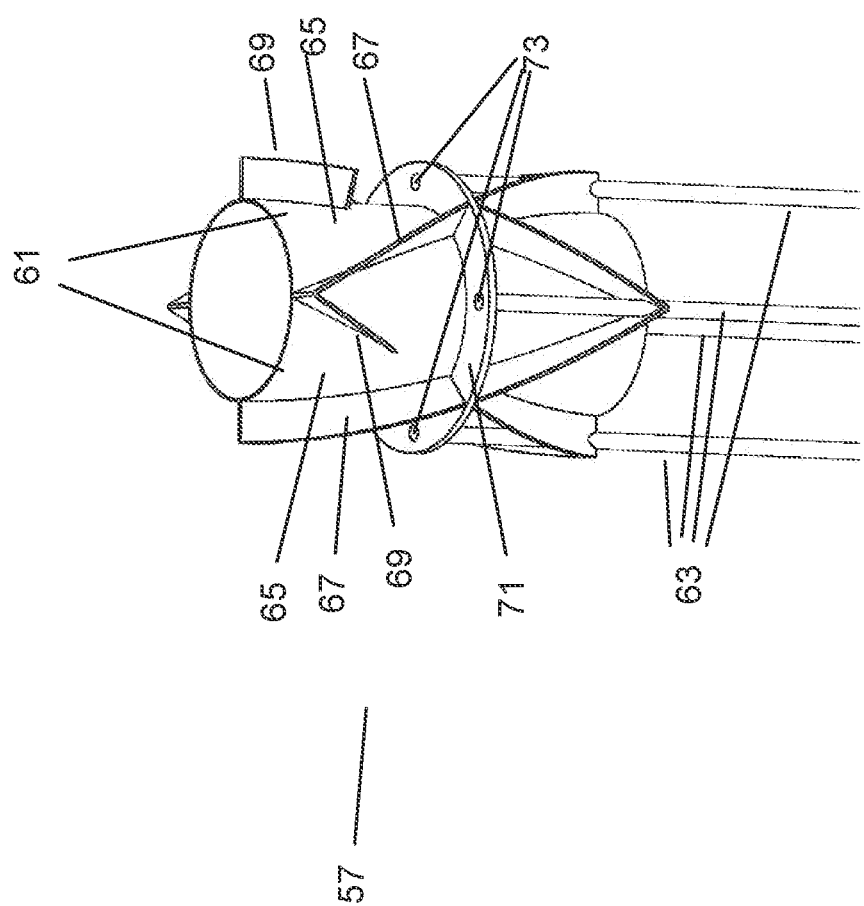
FIG. 17 is a view of the composite baffle element of FIG. 16 with its outer skin removed, to reveal the internal structure, including reflective diffusing vane elements, exit ports, and optical-fiber-like glass rods.

FIG. 17 shows composite baffle 57 with its outer skin removed, so that its internal structure is visible. The glass rod 59 has also been removed from this figure. The inner skin of composite baffle 57 remains. Like the other embodiments shown so far, this embodiment includes four apertures 61 and four cavities 65.

The figure also shows primary diffuser vanes 67, baffle/diffuser vanes 69, cavity floor 71 and fiber port 73. The figure shows all four optical-fiber-like glass rods 63. Light that enters each aperture 61 will tend to be diffused, with a portion of the diffused light entering the corresponding fiber port 73 and coupling into the corresponding glass rod 63.

The embodiment includes four optical-fiber-like glass rods 63, one associated with each detector. In this embodiment, the rods are 1 mm in diameter, much larger than typical optical fibers (which may typically have a light-conducting core 62.5 µm in diameter). Further, in this embodiment, the rods have no cladding such as one typically finds in a fiber—they are exposed to air. Nonetheless, the rods tend to act like optical fibers; this behavior is familiar to anyone who has seen a festive fiber optic party light with its glowing fiber tips. Light impinging onto the rods at a given port 73 will tend to be transmitted to the other end of the glass rod, thus allowing a detector to be placed at the other end of the rod.

The optical-fiber-like glass rods may be any useful diameter, as small as 50 µm or even smaller, if the source is bright enough, or even as large as 10 mm or even larger. In many embodiments, it is desirable to keep the rods small for cost and ease of packaging, and to match the size of the detectors.

Figure 18:
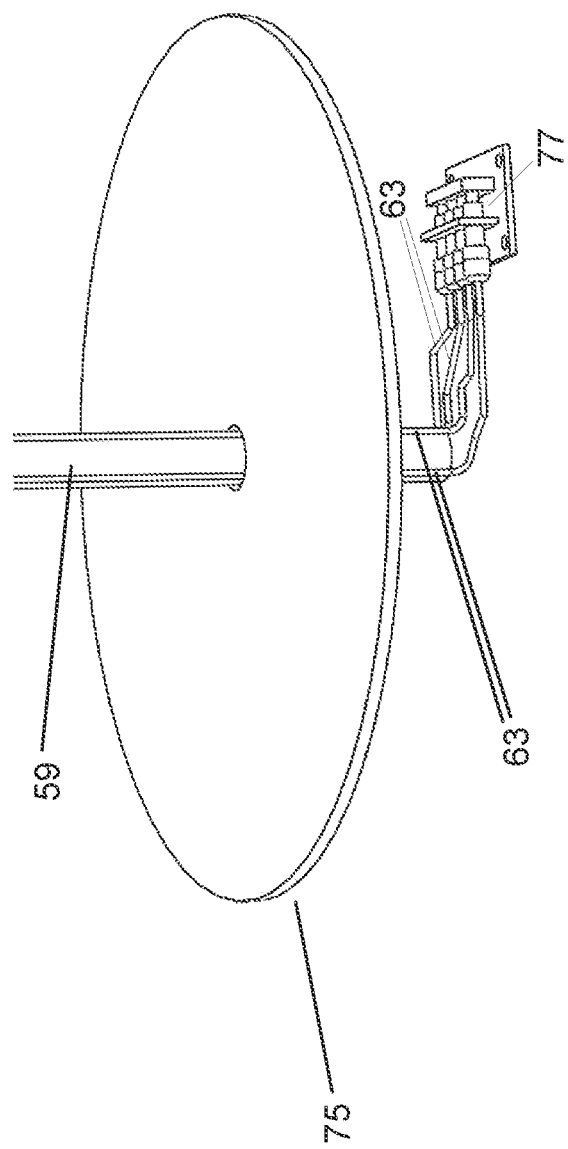
FIG. 18 is a view of how one embodiment may couple optical-fiber-like plastic rods to photodetectors on a circuit board, at a convenient location away from the solar collecting optics.

Just as with a party light, these rods need not necessarily be comprised of glass; they may comprise plastic or any useful optical material. Indeed, any transparent or semi-transparent waveguide may be used, including metallized tubes, hollow-core fibers, or any useful light-guiding element. FIG. 18 is a view at the lower end of the optical-fiber-like rods, which contemplates an embodiment wherein the optical-fiber-like rods are made of plastic and are flexible. Shown in the figure is the bottom deck 75 of collector 55, the same bottom deck shown in FIG. 15.

The figure includes glass rod 59 which will tend to carry concentrated sunlight energy for collection elsewhere; the rod is shown truncated in this view but in practice it will typically continue downward. In the figure, the optical-fiber-like plastic rods turn and bend and terminate in detector block 77, which hosts four detectors, enclosed within the detector block. In the figure, the optical-fiber-like rods 63 are illustrated as a set of connected tubes, but this is simply a limitation of the rendering package—in this embodiment they are continuous solid tubes with no sharp angles or discontinuities.

This embodiment permits the detectors and their associated electronics to be located well away from the heat and mechanical complexity of the target region.

Any numerical range recited herein is intended to include all sub-ranges of the same numerical precision subsumed within the recited range. For example, a range of "1.0 to 10.0" (or "between 1.0 and 10.0") is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. As used herein, "types" of systems refers to "kinds" of systems.

All patents, patent applications, and publications cited herein are incorporated by reference as if individually incorporated. The foregoing detailed description has been given for clarity of understanding only. No unnecessary limitations are to be understood therefrom. The invention is not limited to the exact details shown and described, for variations obvious to one skilled in the art will be included within the invention defined by the claims, and equivalents thereof.

What is claimed is:

1. A system comprising:
a concentrating solar collector, having a nominal focus within a target region;
a first photodetector;
a first aperture in the target region;
a first diffusing element;
a second photodetector;
a second aperture in the target region;
a second diffusing element;
a third photodetector;
a third aperture in the target region; and
a third diffusing element,
wherein the system is configured:
to direct solar light entering the first aperture to propagate to the first photodetector via a first optical path, the first optical path including the first diffusing element;
to direct solar light entering the second aperture to propagate to the second photodetector via a second optical path, the second optical path including the second diffusing element; and
to direct solar light entering the third aperture to propagate to the third photodetector via a third optical path, the third optical path including the third diffusing element.

2. The system of claim 1, comprising a first optically sealed cavity having the first aperture as an input aperture, and an exit port as an output, wherein the first diffusing element is an interior surface of the first optically sealed cavity.

3. The system of claim 1, further comprising a first transparent waveguide, wherein the first optical path further includes a path through the first transparent waveguide.

4. The system of claim 1, wherein the first aperture is adjacent to a glass rod.

* * * * *